United States Patent
Glasserman et al.

(10) Patent No.: US 6,381,586 B1
(45) Date of Patent: Apr. 30, 2002

(54) PRICING OF OPTIONS USING IMPORTANCE SAMPLING AND STRATIFICATION/ QUASI-MONTE CARLO

(75) Inventors: Paul Glasserman, New York; Philip Heidelberger, Cortlandt Manor; Nayyar P. Shahabuddin, Nanuet, all of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/209,245

(22) Filed: Dec. 10, 1998

(51) Int. Cl.[7] .............................................. G06F 17/60
(52) U.S. Cl. ......................................... 705/36; 705/35
(58) Field of Search ............................... 705/10, 35, 36

(56) References Cited

U.S. PATENT DOCUMENTS

| | | | | |
|---|---|---|---|---|
| 5,844,415 A | * | 12/1998 | Gershenfeld et al. | 324/663 |
| 6,061,662 A | | 5/2000 | Makivic | 705/36 |
| 6,178,384 B1 | * | 1/2001 | Kolossvary | 702/27 |

FOREIGN PATENT DOCUMENTS

| | | | |
|---|---|---|---|
| WO | WO 97/07475 | * | 2/1997 |

OTHER PUBLICATIONS

IBM TDB NN9609215, "Quasi–Monte Carlo Rendering with Adaptive Sampling", vol. 39 No. 9: 215–244, Sep. 1, 1996.*
by J. Hammersley and D. Handscomb; Monte Carlo Methods; London: Methuen & Co. Ltd. (1964); pp. 55–61.
by P. Boyle, M. Broadie and P. Glasserman; "Monte Carlo Methods for Security Pricing"; J. Economic Dynamics and Control; (1997); vol. 21, pp. 1267–1321.
by P. Glasserman, P. Heidelberger and P. Shahabuddin; "Asymptotically Optimal Importance Sampling and Stratification for Pricing Path–Dependent Options"; IBM Research Report RC 21178; IBM, Yorktown Heights, NY, (May 11,1998).
by H. Niederreiter; "Random Number Generation and Quasi–Monte Carlo Methods"; CBMS–NSF Regional Conference Series in Applied Mathematics, Society for Industrial and Applied Mathematics, Philadelphia PA (1992): 1–12.
by P. Acworth, M. Broadie and P. Glasserman; "A Comparison of Some Monte Carlo and Quasi Monte Carlo Techniques for Option Pricing"; Monte Carlo and Quasi–Monti Carlo Methods 1966; Lecture Notes in Statistics, vol. 127; Springer–Verlag, NY; pp. 1–18 (1998).
by W. J. Morokoff and R. Caflisch; "Quasi Monte Carlo Simulation of Random Walks in Finance"; Monte Carlo and Quasi–Monte Carlo Methods 1996; Lecture Notes in Statistics, vol. 127; Springer–Verlag NY; pp. 340–352; (1998).

* cited by examiner

Primary Examiner—Eric W. Stamber
Assistant Examiner—Donald L. Champagne
(74) Attorney, Agent, or Firm—Whitham, Curtis & Christofferson, P.C.; Robert P. Tassinari, Jr.

(57) ABSTRACT

A computer implemented method prices derivative securities (for example, options) by selecting an importance sampling (IS) distribution and combining the chosen IS distribution with stratified sampling. The process consists of the steps of choosing an importance sampling distribution and combining the chosen importance sampling with stratification or Quasi-Monte Carlo (QMC) simulation. In the first step, an importance sampling distribution is chosen. In the second step, the chosen importance sampling is combined with stratification or Quasi-Monte Carlo sequencing. The pricing of many types of securities reduces to one of estimating an expectation of a real-valued function of some random variables.

40 Claims, 7 Drawing Sheets

PRICING OF OPTIONS USING IMPORTANCE SAMPLING AND STRATIFICATION/ QUASI-MONTE CARLO

BACKGROUND OF THE INVENTION

1. Field of the Invention

The present invention generally relates to computer implemented methods for pricing derivative securities (for example, options) in the finance industry and, more particularly, to such methods having improved efficiency and that select an importance sampling (IS) distribution and combining the selected IS distribution with stratified sampling or Quasi-Monte Carlo (QMC) in novel ways to price financial instruments.

2. Background Description

Monte Carlo simulation is widely used in the finance industry to price derivative securities. However, the method can be quite inefficient because of large variances associated with the estimates. Variance reduction techniques are therefore required. While a large number of such techniques have been developed, more efficient methods are needed for a variety of financial instruments.

A basic survey on general variance reduction techniques, including both the techniques of importance sampling (IS) and stratified sampling, is found in *Monte Carlo Methods* by J. Hammersley and D. Handscomb, Methuen & Co. Ltd., London (1964), pp. 55–61. A survey on the use of Monte Carlo methods in finance is described by P. Boyle, M. Broadie, and P. Glasserman in "Simulation Methods for Security Pricing", *J. Economic Dynamics and Control,* Vol. 21, pp. 1267–1321 (1998). A survey and description of the state-of-the-art for variance reduction in finance applications is included in the article entitled "Asymptotically Optimal Importance Sampling and Stratification for Pricing Path-Dependent Options" by P. Glasserman, P. Heidelberger and P. Shahabuddin. *IBM Research Report RC* 21178, Yorktown Heights, N.Y. (1998). The use of Quasi-Monte Carlo (QMC) sequences (see, for example, H. Niederreiter, "Random Number Generation and Quasi-Monte Carlo Methods", CBMS-NSF Regional Conference Series in Applied Mathematics, Society for Industrial and Applied Mathematics (1992)) as a variance reduction technique in finance applications has also been considered (see, for example, P. Acworth, M. Broadie and P. Glasserman, "A Comparison of Some Monte Carlo and Quasi Monte Carlo Techniques for Option Pricing", in *Monte Carlo and Quasi-Monte Carlo Methods* 1996, Lecture Notes in Statistics, Vol. 127, Sringer-Verlag, pp. 1–18 (1998), and W. J. Morokoff and R. Caflisch, "Quasi Monte Carlo Simulation of Random Walks in Finance", in *Monte Carlo and Quasi-Monte Carlo Methods* 1996, Lecture Notes in Statistics, Vol. 127, Sringer-Verlag, pp. 340–352 (1998), and the references therein). The effectiveness of quasi-Monte Carlo (QMC) sequences decreases as the dimension of the problem increases. Therefore, as described in the above references, it is important to assign the lowest dimensions of the QMC sequence to the most "important" dimensions, or directions.

As described in the above references, the prior art identifies a zero variance estimator; however, it is not practical to implement since it typically requires both knowing the option's price in advance and sampling from non-standard distributions. In the less general setting of estimating the probability of an event, the prior art also identifies an IS distribution by maximizing a "rate function" over the event.

SUMMARY OF THE INVENTION

It is therefore an object of the invention to provide a computer implemented method for pricing derivative securities, e.g., options, that selects an importance sampling (IS) distribution combined with stratified sampling or quasi-Monte Carlo (QMC) sequences.

According to the invention, there is provided a process with which securities may be priced. This process consists of the steps of choosing an importance sampling distribution and combining the chosen importance sampling with stratification or quasi-Monte Carlo (QMC) simulation. In the first step, an importance sampling distribution is chosen. In the second step, the chosen importance sampling is combined with stratification or Quasi-Monte Carlo sequencing.

The present invention improves upon earlier methods by selecting an importance sampling distribution in a general, novel and effective way. Furthermore, it also combines importance sampling with stratified sampling in a general, novel and effective way. The pricing of many types of securities reduces to one of estimating an expectation of a real-valued function of some random variables.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF PREFERRED EMBODIMENTS OF THE INVENTION

The invention may be implemented on a variety of hardware platforms ranging from high end personal computers (PCs) using, for example, Pentium® II processors or equivalent, and workstations, such the IBM RS/6000 work station based on the PowerPC® processor, to mini and main frame computers, such as the IBM AS/400 and ES/9000 series of computers, to highly parallel supercomputers, as the IBM SP2. Application code can be written in a variety of popular computer programming languages to run on a variety of operating systems (OS) appropriate to the hardware platform including, for example, Windows 95/98 and NT, OS/2, and Unix, among others.

Figure 1:
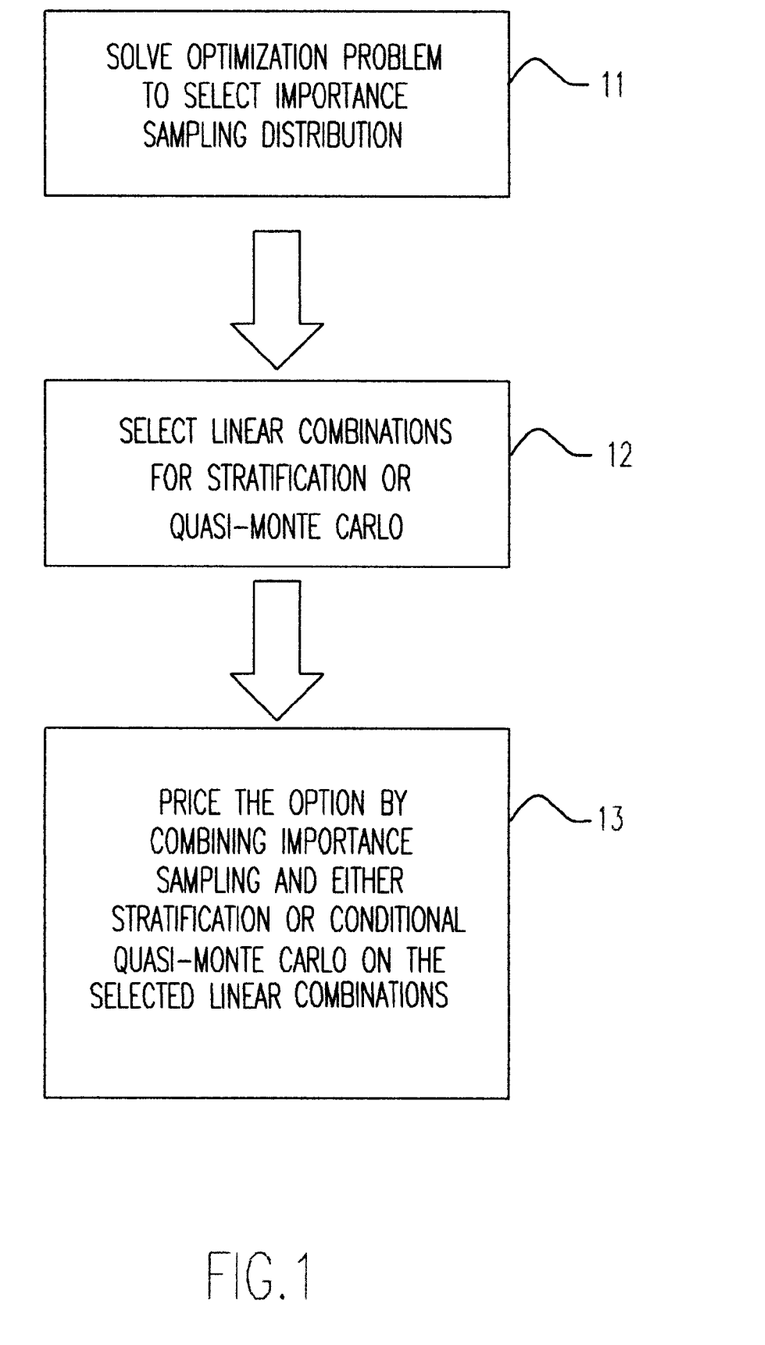
FIG. 1 is a flow diagram showing the overall logic of the option pricing process according to the present invention.

Referring now to the drawings, and more particularly to FIG. 1, there is shown an overall flow diagram for the option pricing process according to the present invention. In the first step 11, an importance sampling distribution is chosen. This is done as follows. Let a denote the point that maximizes the payoff times the probability (under the original density $f$), i.e., $G(a)f(a) \geq G(z)f(z)$ for all points z, where $G(z)$ is the option payoff and $f(z)$ is the joint probability density function. We assume that such an a exists and is unique, which is commonly satisfied in practice. The set of possible importance sampling (IS) distributions is selected from a parameterized class of distributions. Let h(z, c) denote the density when the parameter is c (c may be vector valued). We set the parameter for importance sampling (IS) to be b, where b is chosen so that $h(z, b) \leq h(a, b)$ for all points z. With this selection of the parameter b, the importance sampling (IS) distribution makes the point a the "most likely" point to be sampled. While such a b may not be unique, we assume that the class importance sampling (IS) distributions is chosen so that at least one such b exists.

Figure 2:
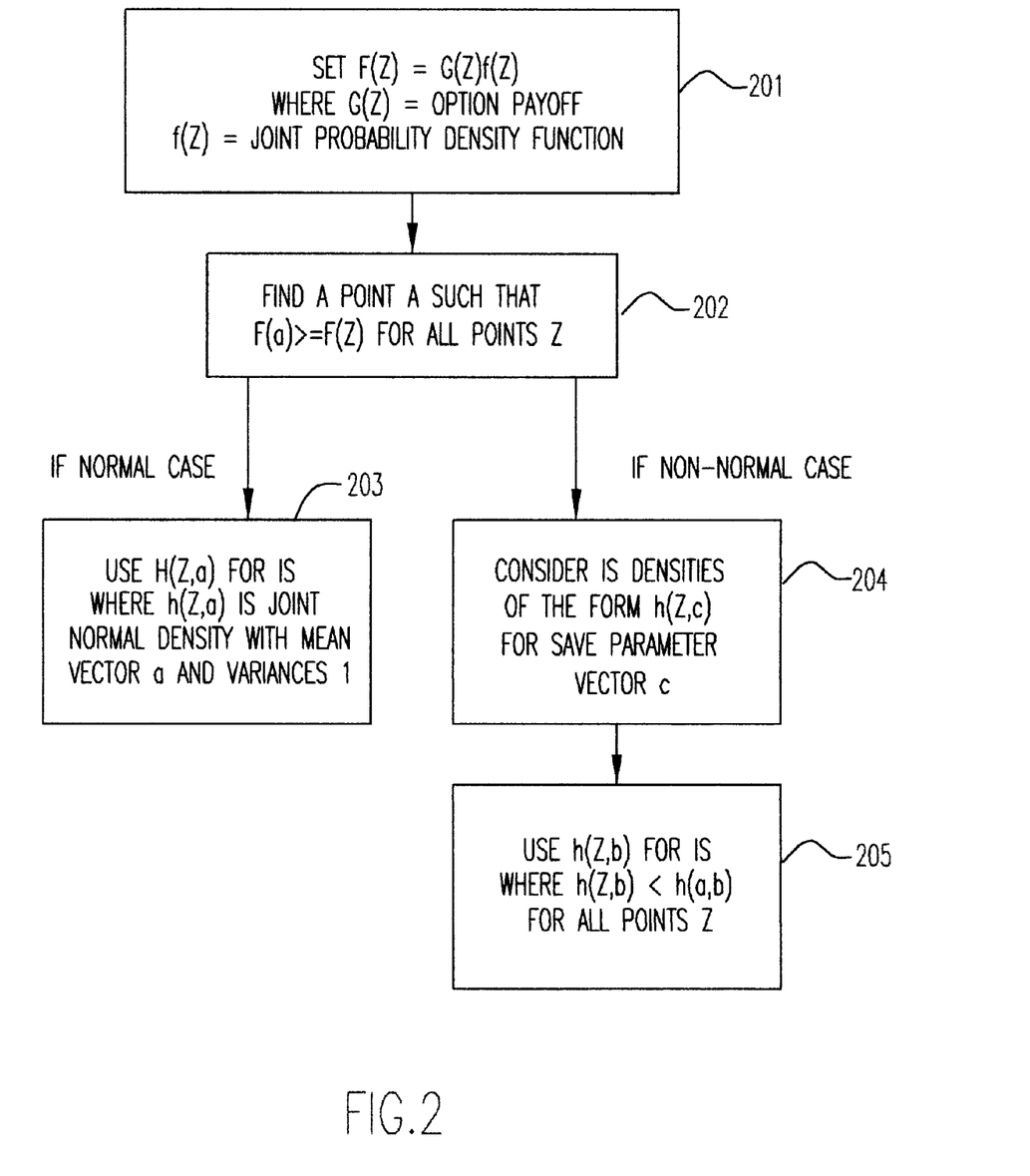
FIG. 2 is a flow diagram showing the logic of the selection of importance sampling distribution.

The process of the first step may be implemented on a computer as illustrated in FIG. 2. In function block 201, F(z) is set equal to G(z)f(z), where G(z) is the option payoff and f(z) is the joint probability function. Then a search is made in operation block 202 to find a point a such that $F(a) \geq F(z)$ for all points z. There are two outcomes of this search; the normal case (f(z) is the joint density representing independent, normally distributed random variables with mean 0 and variance 1) and the non-normal case. If the normal case, h(z, a) is used for importance sampling (IS) in function block 203, where h(z, a) is the joint density of independent normals with mean vector a and variances 1. If the non-normal case, importance sampling (IS) densities of the form h(z,c) are considered for some parameter vector c in function block 204. Then, in function block 205, h(z, b) is used for importance sampling (IS), where $h(z, b) \leq h(a, b)$ for all points z.

In the second step 12 in FIG. 1, the chosen importance sampling (IS), whether from function block 203 (the normal case) or function block 205 (the non-normal case) in FIG. 2, is combined with stratification or quasi-Monte Carlo sequencing as follows. The quantity to be estimated is A=E[L(z)G(z)] where E denotes the expectation when sampling with density h(z, b) and L(z)=f(z)/h(z,b) is the likelihood ratio. We now apply either stratified sampling or a conditional QMC sampling to this new estimation problem. One or more linear combinations (directions) of the z's are chosen. Specifically, if k linear combinations are selected, let U be a matrix with k rows and d columns and let Y=U z. The joint distribution of this linear combination is determined when z has the density function h(z, b). Then the distribution of z given Y is determined. Either stratified sampling upon Y is performed, or Y is sampled using QMC. Given a Y (sampled by either method), the values of z are sampled (either using random sampling or QMC) from the conditional (upon Y) distribution. An estimate of the option's price is obtained in this manner.

The present invention improves upon earlier methods by selecting an importance sampling (IS) distribution in a general, novel and effective way. Furthermore, it also combines importance sampling with stratified sampling in a general, novel and effective way. While stratified sampling can be applied in multiple dimensions, its efficiency also decreases as the number of dimensions for stratification increases. A novel feature of the invention is to identify a small number of key directions, or dimensions, that will be most effective for stratification. Furthermore, the combination of importance sampling (IS) and stratification can be replaced by a combination of importance sampling (US) and quasi-Monte Carlo (QMC) techniques, where the QMC sequences are applied to the most important directions as described above. The result is that a variety of financial derivative instruments, such as path dependent "European" and "Asian" securities on stocks, and "European" securities on interest rate sensitive securities such as bond options, "caplets", and "caps" can be accurately priced with far fewer sample paths than are required with standard Monte Carlo techniques. For example, results reported in Glasserman, Heidelberger, and Shahabuddin, supra, show that the per path variance obtained using the invention is up to 16,000 times less than that of standard Monte Carlo for pricing certain Asian securities. The invention is particularly effective at pricing deep out-of-the-money securities. Results reported in Glasserman, Heidelberger, and Shahabuddin also show that the per path variance obtained using the invention is up to 190,000 times less than that of standard Monte Carlo for pricing Asian securities with a deep out-of-the-money knock-in barrier.

The pricing of many types of securities in step 13 of FIG. 1 reduces to one of estimating an expectation of a real-valued function of some random variables, i.e., estimating A=E[G(z)] where E denotes the expectation operator, G is the payoff function (assumed non-negative), and z is a multidimensional (dimension d) stochastic vector having a specified distribution with density (or mass function) $f$. For example, in finance applications, z are typically independent and identically distributed normal random variables with mean zero and variance one. In its simplest form, Monte Carlo simulation entails random sampling of vectors z(1), . . . , z(N) to produce some number (N) of paths and then averaging G(z(1)), . . . , G(z(N)) to produce an estimate of A. With importance sampling (IS), the random vectors z(1), . . . , z(N) are sampled from a different distribution with density, say, h. The quantity A is then estimated (without statistical bias) by averaging x(1), . . . , x(N) where x(i)=L(z(i))G(z(i)) and L(z(i))=f(z(i))/h(z(i)) is the likelihood ratio. The key problem in applying this technique is selection of an effective importance sampling (IS) distribution h. In stratified sampling, a stratification random vector Y is identified along with s strata (or non-overlapping bins into which Y is partitioned). For stratum number s, N(s) samples of Y that are guaranteed to fall in strata s are drawn. For each sample, the vector z is drawn where the distribution of z is that of z given Y. The payoffs for each strata s are averaged to produce a number A(s). Then A is estimated (without statistical bias) by p(1)A(1)+ . . . +p(s)A(s) where p(s) is the probability that Y falls in stratum s.

We now focus on the most common and important situation arising in option pricing, namely when the z's are independent and identically distributed standard normal random variables (with mean 0 and variance 1). In this case, special structure allows for particularly efficient and effective selections of both the importance sampling density h(z, b) and the linear combinations for stratification (or QMC). The assumption that the mean is 0 and variance is 1 is not a restriction, since arbitrary multivariate normal distributions can be obtained through samples of independent standard normals.

First, the class of IS distributions may be restricted to have density h(z, c) which now specifically denotes the joint density of independent normals with mean vector c and variances 1. With this choice, then there exists a unique b in step one and in fact b=a. That is, the IS distribution is independent normals with mean vector a=(a(1), . . . , a(d)) and variances 1. Of course, one skilled in the art would recognize that a natural modification of this approach is to select an IS distribution which is close to or approximates the aforementioned normal distribution.

Second, in the normal distribution case, the distribution of linear combinations (the Y) and the distribution of the z's given Y in step two are well known from the standard literature on multivariate normal distributions. Furthermore, these distributions are themselves multivariate normal distributions that can be easily sampled (using for example inverse transformation techniques). In addition, while step two above permits the selection of any set of linear combinations U, in the normal distribution case a preferred embodiment of the invention selects U according to one of the following two rules:

Rule 1

One linear combination is selected and that linear combination is U=a, i.e., Y=a(1)z(1)+ . . . +a(d)z(d).

Rule 2

There are k($1 \leq k \leq d$) linear combinations which are a subset of the Eigenvectors of a matrix H where H is the "Hessian" matrix of ln(G(a)) (where "ln" denotes the natural logarithm). More specifically, the element H(i,j) is the second partial derivative of the function ln(G(z)) with respect to z(i) and z(j) evaluated at the point a. In the preferred embodiment, the Eigenvectors are selected according to the following priority rule. Let e(1), . . . , e(d) denote the Eigenvalues of H. We assume these are ordered such that $$\left(\frac{e(1)}{1-e(1)}\right)^2 \geq \left(\frac{e(2)}{1-e(2)}\right)^2 \geq \ldots \geq \left(\frac{e(d)}{1-e(d)}\right)^2.$$

Let v(i) denote the Eigenvector of H associated with Eigenvalue e(i). The $i^{th}$ row of the matrix U is then set equal to v(i). The matrix H may be known in closed form, or it may be estimated by using a finite difference approximation. The Eigenvectors are assumed to be ortho-normal; i.e., $$\sum_{k=1}^{d} v(i,k)v(j,k) = 1 \text{ if } i = j$$
$$= 0 \text{ if } i \neq j$$

Selection of Stratification Variables for the Normal Case

Figure 3:
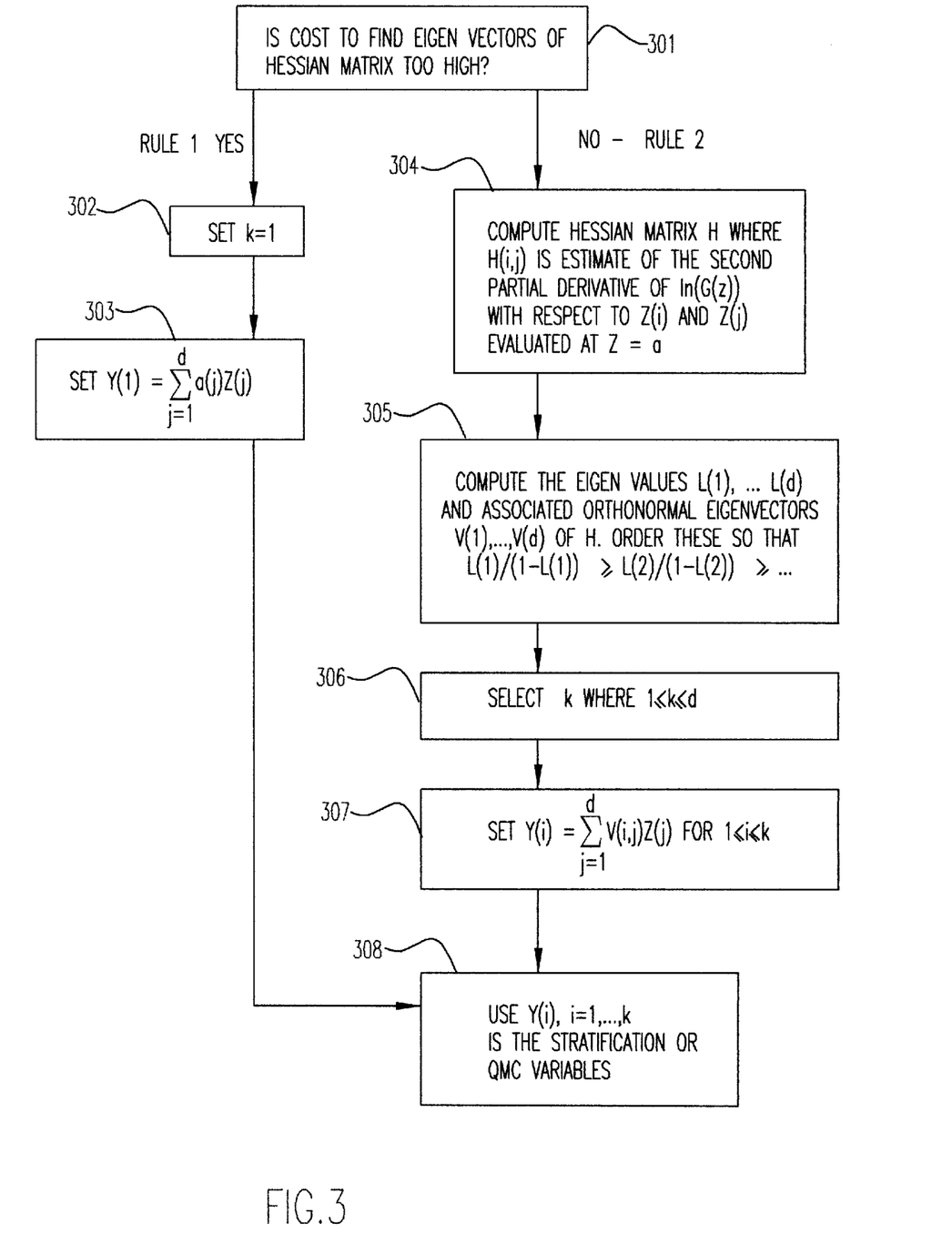
FIG. 3 is a flow diagram showing the logic of the selection of linear combinations for stratification or quasi-Monte Carlo for the normal distribution case.

FIG. 3 is the flow diagram implementing the selection of linear combinations for stratification or QMC for the normal distribution case. The first step in the process is to determine in decision block 301 whether the cost to find Eigenvectors of Hessian matrix is too high, if so, Rule 1 is applied and k is set to 1 in function block 302 and Y(1) is set to $$\sum_{j=1}^{d} a(j)z(j)$$

in function block 303. If the cost is not too high, Rule 2 is applied, and the Hessian matrix H is computed in function block 304. In the computation, H(i, j) is the estimate of the second partial derivative of ln(G(z)) with respect to z(i) and z(j) evaluated at z=a. Next, in function block 305, the Eigenvalues e(1), . . . ,e(d) and associated orthonormal eignevectors v(1), . . . , v(d) of matrix H are computed. These are ordered so that $$\left(\frac{e(1)}{1-e(1)}\right)^2 \geq \left(\frac{e(2)}{1-e(2)}\right)^2 \geq \ldots \geq \left(\frac{e(d)}{1-e(d)}\right)^2.$$

Then, in function block 306, k is selected where $1 \leq k \leq d$, and, in function block 307, Y(i) is set to $$\sum_{j=1}^{d} a(i,j)z(j)$$

for $1 \leq i \leq k$. Finally, from either function block 303 or 307, Y(i), i=1, . . . ,k are used as the stratification or QMC variables. Again, one skilled in the art would recognize that a natural modification of this approach is to select combinations which approximate the aforementioned linear combinations.

Selection of Stratification Variables for the Non-Normal Case

We now consider the case that f (z) is not a multivariate normal density. Identify a number k of variables for stratification. Select constants x={x(i,j), for j=1, . . . ,d and i=1, . . . ,k} and define stratification variables Y(x,i)=x(i,1)z(1)+ . . . +x(i,d)z(d). Let v(x) be an estimate of E[Var(L(z)G(z)|Y(x,1), . . . ,Y(x,k))]. Now find x*={x*(i,j) for j=1, . . . ,d and i=1, . . . ,k} so that v(x*)$\leq$v(x) for all x such that x(i,1)$^2$+x(i,2)$^2$+ . . . +x(i,d)$^2$=1. Use Y(x*,1), . . . , Y(x*,k) as stratification or QMC variables.

For example, pilot studies could be run at a fixed set of x's and v(x) could be estimated using regression techniques. To effectively accomplish this procedure requires that (1) the distribution of a linear combination of z's be known and straightforward to sample from and (2) the distribution of the z's given the linear combinations be known and straightforward to sample from. Such is the case in the normal distribution setting. In more general settings, this may be more difficult to accomplish; however, one can generally stratify upon the particular class of linear combinations that assign non-zero weights to only one variable (per linear combination). More specifically, one could simply select z(1), . . . , z(k) for stratification or QMC. For a fixed k, finding x* above would consist of finding the subset of size k of the z's that provides the most variance reduction.

Figure 4:
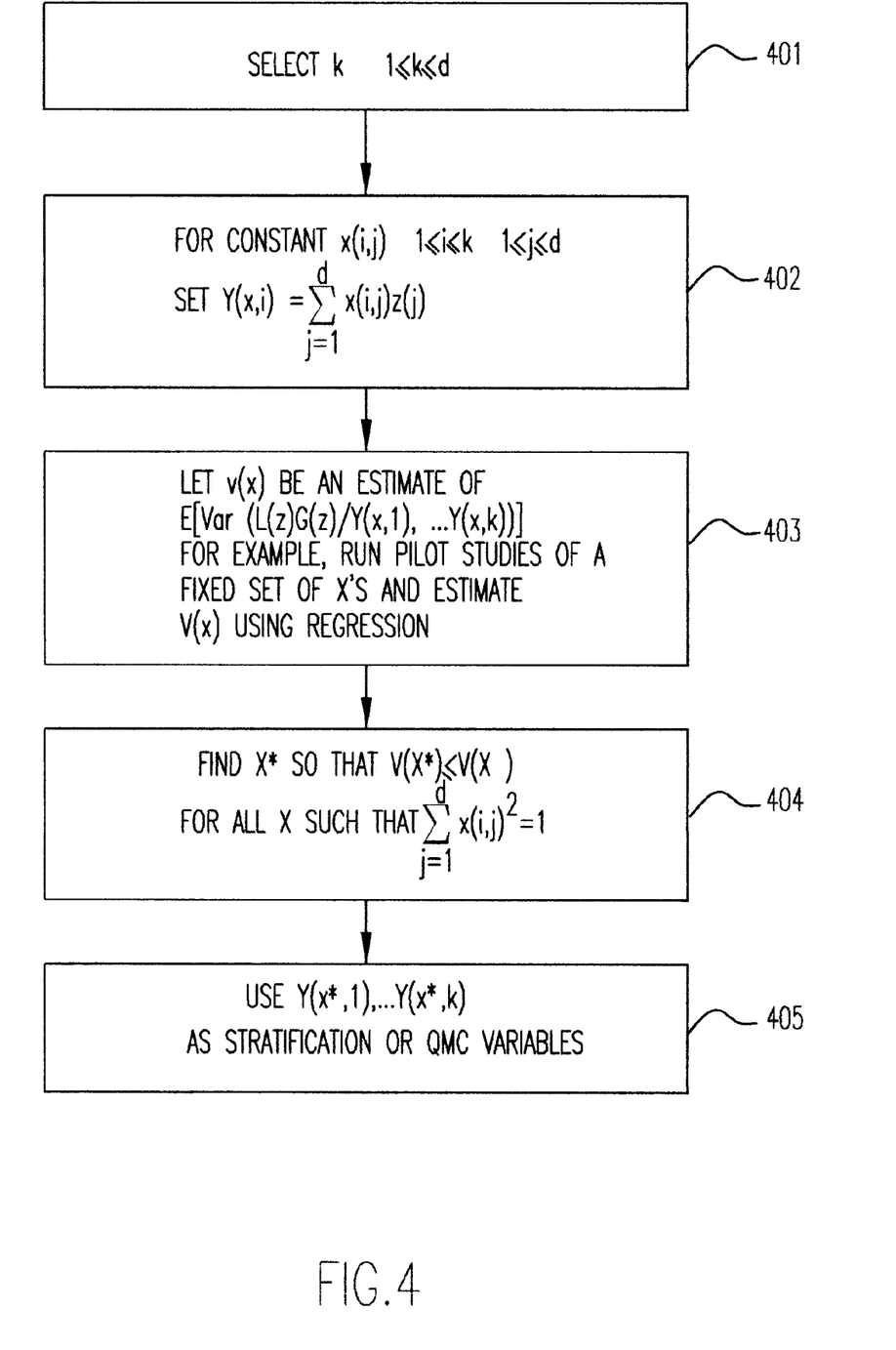
FIG. 4 is a flow diagram showing the logic of the selection of linear combinations for stratification or quasi-Monte Carlo for the non-normal distribution case.

FIG. 4 is the flow diagram implementing the selection of linear combinations for stratification or QMC for the non-normal distribution case. The first step in the process is to select a k, $1 \leq k \leq d$, in function block 401. For constants x(i,j), $1 \leq i \leq k$ and $1 \leq j \leq d$, Y(x,i) is set to $$\sum_{j=1}^{d} x(i,j)z(j)$$

in function block 402. Then, in function block 403, v(x) is taken as an estimate of E[Var(L(z)G(z)|Y(x,1), . . . , Y(x,k))]. This is done, for example, by running pilot studies at a fixed set of xs and estimated v(x) using regression. Next, in function block 404, x* is found so that v(x*)$\leq$v(x) for all x such that $$\sum_{j=1}^{d} x(i,j)^2 = 1.$$

Finally, in function block 405, Y(x*,1), . . . , Y(x*,k) are used as the stratification or QMC variables.

One skilled in the art can appreciate that a simple extension of this approach would be to select random variables of the form Y(x,i)=g(i,x,z) for stratification or QMC for general functions of g that depend on constants x and the underlying random variables z.

Figure 5:
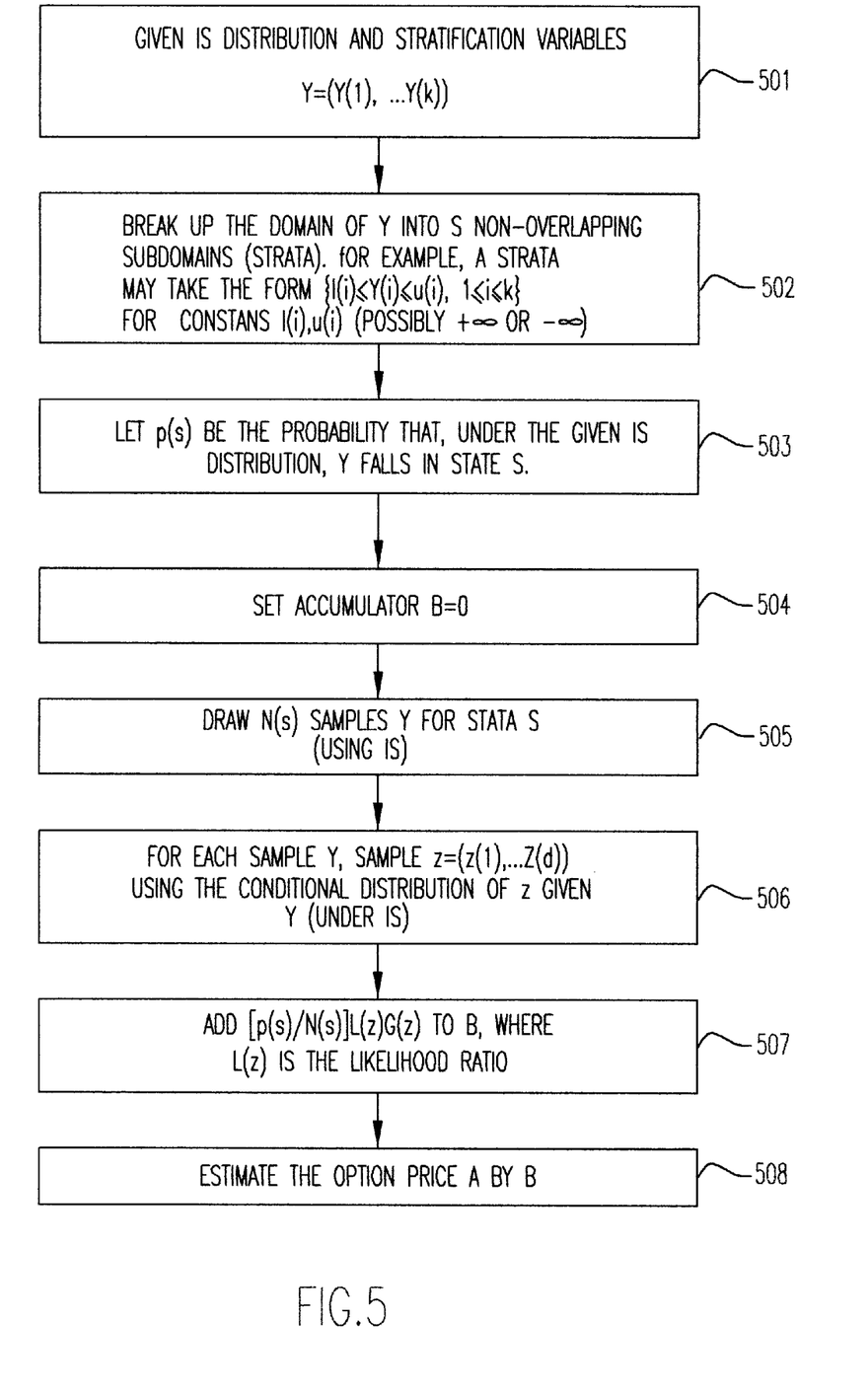
FIG. 5 is a flow diagram showing the logic of combining stratified sampling and importance sampling (IS)

FIG. 5 is the flow diagram of combining stratified sampling and importance sampling (IS). The first step in the process is to input the IS distribution and stratification variables Y=Y(1), . . . , Y(k) in function block 501. the domain of Y is then broken up into s non-overlapping subdomains (strata) in function block 502. For example, a strata may take the form $\{l(i) \leq Y(i) \leq u(i), 1 \leq i \leq k\}$ for constants l(i), u(i). In function block 503, p(s) is the probability that, under the given IS distribution, Y falls in strata s. The accumulator B is set to zero in function block 504. N(s) samples Y are drawn from strata s (using IS) in function block 505. For each sample Y, z is sampled in function block 506 using the conditional distribution of z given Y (under IS) for z=(z(1), . . . , z(d)). [p(s)/N(s)]L(z)G(z) is added to the accumulator B in function block 507, where L(z) is the likelihood ratio. Finally, in function block 508, the option price A is estimated by the content of the accumulator B.

Figure 6:
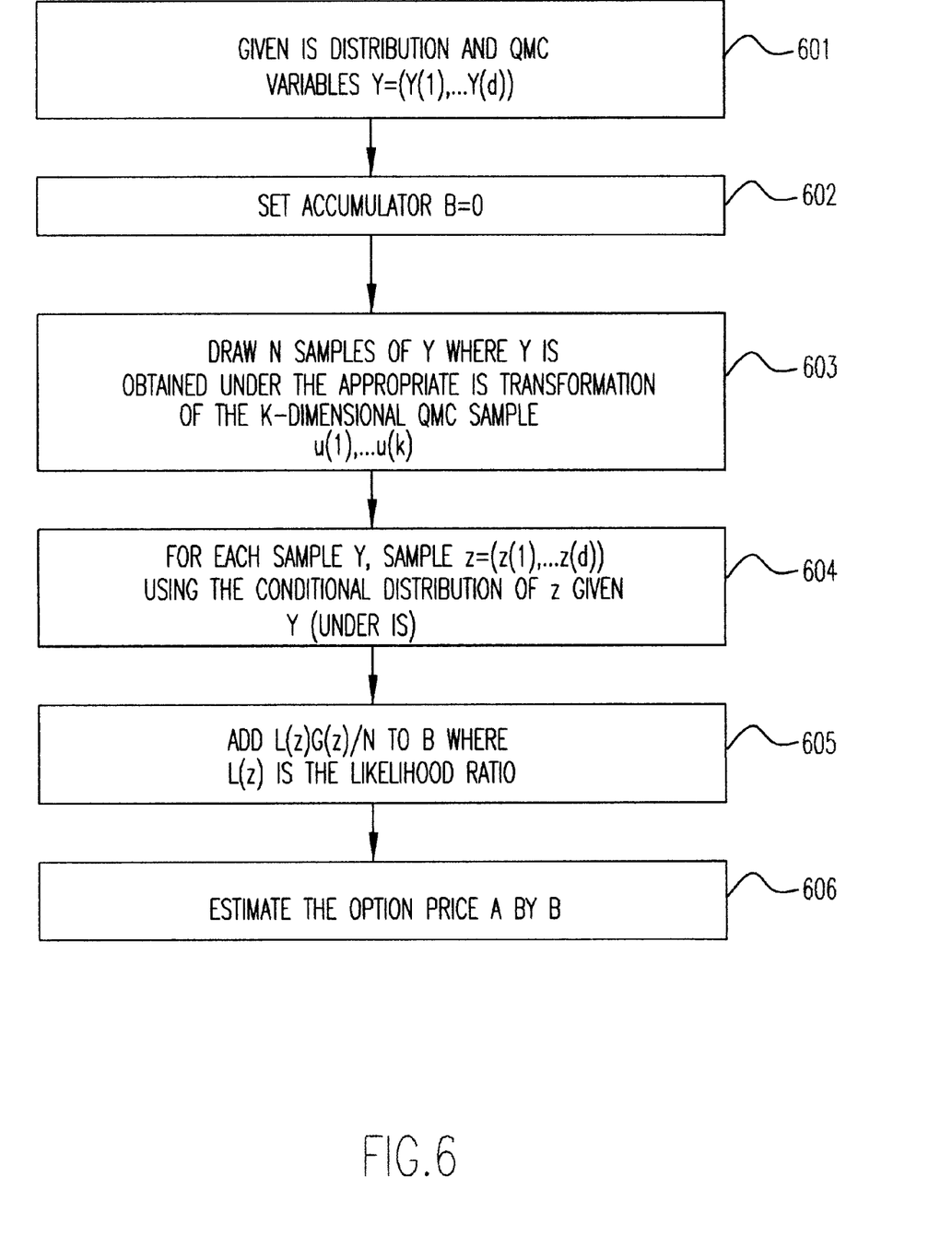
FIG. 6 is a flow diagram showing the logic of combining quasi-Monte Carlo (QMC) sequences and importance sampling (IS)

FIG. 6 is similar to FIG. 5 but shows the logic of combining the QMC and importance sampling. As in FIG. 5, the first step in the process is to input the IS distribution and stratification variables Y=Y(1), . . . , Y(k) in function block 601. The accumulator B is set to zero in function block 602. Then, in function block 603, N samples of Y are drawn, where Y is obtained under the appropriate IS transformation of the k-dimensional QMC sample u(1), . . . , u(k). For each sample Y, z is sampled in function block 604 using the conditional distribution of z given Y (under IS) for z=(z(1), . . . , z(d)). L(z)G(z)/N is added to the accumulator B in function block 605, were L(Z) is the likelihood ratio. Finally, in function block 606, the option price A is estimated by the content of the accumulator B.

Figure 7:
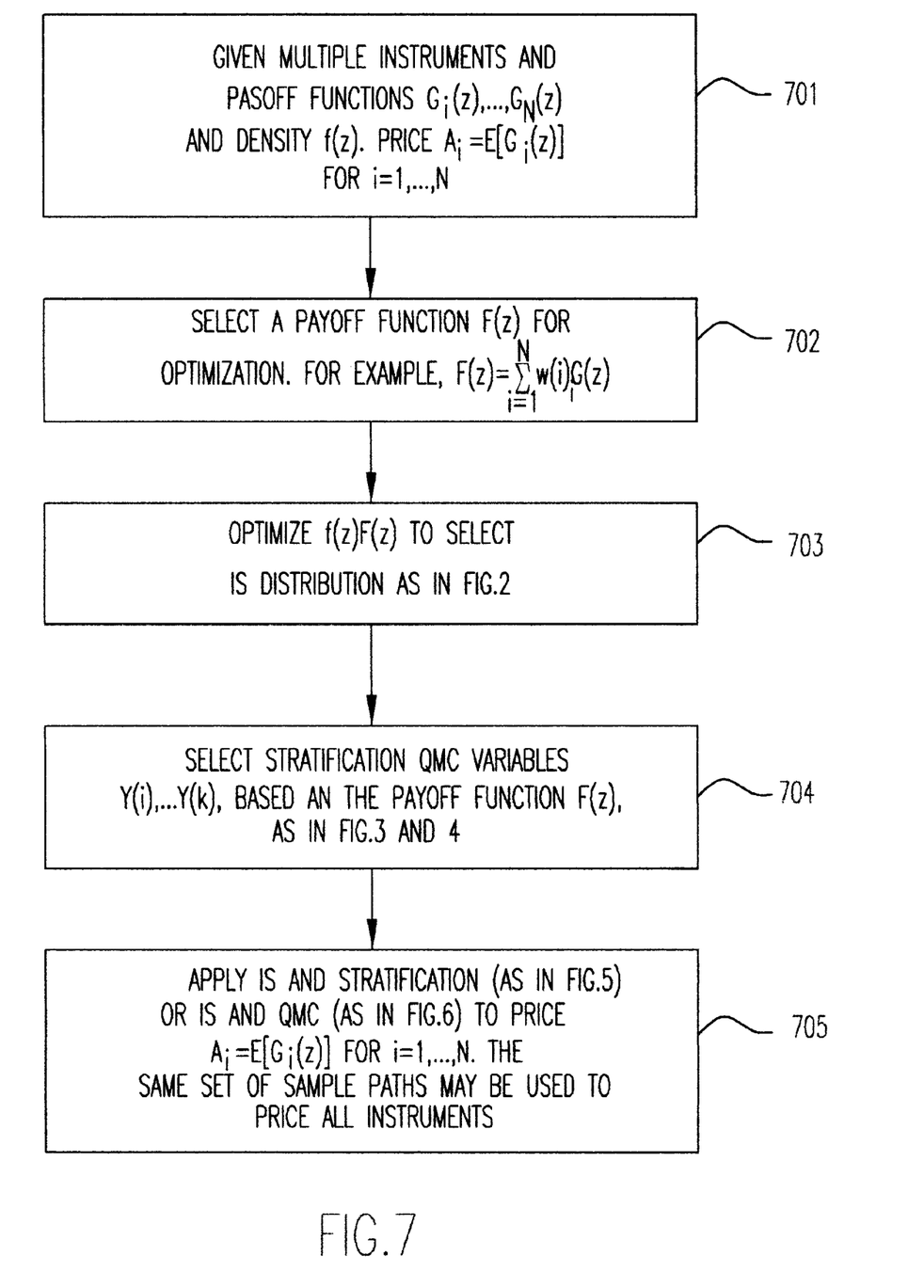
FIG. 7 is a flow diagram showing the logic of pricing multiple instruments using the principles of FIGS. 2 to 6.

FIG. 7 shows the logic of pricing multiple instruments. Given multiple instruments and payoff functions $G_1$ (z), . . . , $G_N$ (z) and density f (z), the price $A_i$ is set to $E[G_i$ (z)] for i=i, . . . , N, in function block 701. A payoff function F(z) is selected for optimization in function block 702. For example, for a set of weights w(i), F(z) is selected to be $$\sum_{i=1}^{N} w(i)G_i(z) \cdot f(z)F(z)$$

is optimized in function block 703 to select IS distribution as in FIG. 2. Stratification or QMC variables Y(1), . . . ,Y(k) are selected in function block 704 based on the payoff function F(z), as in FIGS. 3 and 4. Finally, in function block 705, either IS and stratification (as in FIG. 5) or IS and QMC (as in FIG. 6) are applied to the price $A_i$=E[$G_i$(z)], for i=1, . . . , N. The same set of sample paths may be used to price all instruments.

Numerical Examples

Tables 1 and 2 illustrate the effectiveness of the method. These are extracted from a more extensive investigation reported in http://www.research.ibm.com/people/b/berger/papers/RC21178. The fall document should be consulted for details. Table 1 documents the effectiveness of the method in pricing an Asian option with the following parameters:

$S_0$=initial price of underlying asset r=interest rate

T=expiration of option

σ=volatility of underlying asset n=number of steps in path

K=strike price

TABLE 1

Estimated variance reduction ratios for the Asian option. All results are based on a total of 1,000,000 runs. Stratified resulst use 100 strata. All results use S0 = 50, r = 0.05 and T = 1.0. Of the last two columns, the first shows results based on stratifying along the optimal μ and the second based on stratifying along the optimal eigenvector.

| Parameters | | | | Importance Sampling | Importance Sampling and Stratification | |
|---|---|---|---|---|---|---|
| | | | | Variance | Variance | Variance |
| n | σ | K | Price | Ratio | Ratio (μ) | Ratio ($v_j$) |
| 16 | 0.10 | 45 | 6.05 | 11 | 1,097 | 1,246 |
| | | 50 | 1.92 | 7.0 | 4,559 | 5,710 |
| | | 55 | 0.20 | 21 | 15,520 | 17,026 |
| 16 | 0.30 | 45 | 7.15 | 8.3 | 1,011 | 1,664 |
| | | 50 | 4.17 | 9.2 | 1,304 | 1,899 |
| | | 55 | 2.21 | 12 | 1,746 | 2,296 |
| 64 | 0.10 | 45 | 6.00 | 11 | 967 | 1,022 |
| | | 50 | 1.85 | 7.3 | 4,637 | 5,665 |
| | | 55 | 0.17 | 23 | 16,051 | 17,841 |
| 64 | 0.30 | 45 | 7.02 | 8.3 | 1,016 | 1,694 |
| | | 50 | 4.02 | 9.2 | 1,319 | 1,971 |
| | | 55 | 2.08 | 12 | 1,767 | 2,402 |

The last two columns of Table 1 show the computational gains achieved through the implementations of the method corresponding to Rules 1 and 2 of FIG. 3. For example, an entry of 1,097 indicates that our method is 1,097 times more computationally efficient than ordinary Monte Carlo.

Table 2 reports similar results for pricing bonds in the CIR interest rate model with the following parameters:

T=bond maturity (in years)

$r_0$ initial interest rate

σ=volatility of interest rate n=number of simulated steps

TABLE 2

Estimated variance reduction ratios for bond prices in the CIR model. Prices are for face value of 100. All results are based on a total of 1,000,000 runs, with d = 2, κ = 0.05, σ = 0.08, and n = 16. Stratified results use 100 strata.

| Parameters | | | Importance Sampling | Importance Sampling and Stratification | |
|---|---|---|---|---|---|
| | | | Variance | Variance | Variance |
| T | $r_0$ | Price | Ratio | Ratio (μ) | Ratio ($v_j$) |
| 0.25 | 0.044 | 98.90 | 227 | 397 | 411 |
| | 0.064 | 98.41 | 330 | 576 | 597 |
| | 0.084 | 97.92 | 433 | 755 | 771 |
| 1.0 | 0.044 | 95.66 | 57.2 | 104 | 108 |
| | 0.064 | 93.81 | 82.7 | 150 | 155 |
| | 0.084 | 91.99 | 108 | 197 | 203 |

The results reported in Table 2 show that the method is 100 to 700 times more computationally efficient in these examples.

Extensions to the Basic Method

Extension 1

Selecting a to approximately optimize G(z)f(z). For example, we may solve a problem with a reduced number of variables z and then expand to the full dimensionality by setting z=g(z) for some function g. In other words, pick a to optimize G(g(a))f(g)(a)) and then set a=g(a). Examples of g are linear interpolation, or spline interpolation, between a selected subset of the z's, or a linear transformation z=M z̲.

Extension 2

Selecting a to optimize F(z)f(z) where F is a different function than G. For example, if more than one instrument is being priced, say $A_1=E[G_1(z)], \ldots, A_N=E[G_N(z)]$, the simulation could be optimized for $F(z)=G_1(z)$, for example, and then the same simulation parameters (and paths) could be used to estimate $A_1, A_2, \ldots, A_N$ thus saving both optimization time and simulation time. More generally, one could set $F(z)=w(1)G_1(z)+ \ldots +w(N)G_N(z)$ for some set of weights $w(1), \ldots, w(N)$. Examples include the same instrument but with different strike prices, or an instrument and its "Greeks" (sensitivities). Another example occurs in pricing a large portfolio of instruments as in a value at risk (VaR) calculation. To evaluate G requires evaluating a large number of instruments. In this case, F would be chosen to be a subset of the instruments, a "proxy" group, thereby reducing optimization costs. For example, if $G(z)=G_1(z)+ \ldots +G_N(z)$, we may pick $F(z)=G_1(z)+ \ldots +G_M(z)$ where M<<N. We may further break up the portfolio into groups of similar instruments and use different parameters to simulate the different groups separately. A different proxy group for each subset may also be selected.

Extension 3

To reduce the cost of computing the Hessian matrix, and finding the required Eigenvectors, the Hessian matrix and Eigenvectors of a smaller matrix may be computed. Specifically, approximate G(a) by G(M a̲) for some matrix M and lower dimensional vector a̲. Let $H_M$ be the Hessian matrix of ln G(M a̲). Let E(i) be the Eigenvalues of the matrix $(M^T M)^{-1} H_M$ ordered so that $[E(1)/(1-E(1))]^2 \geq [E(2)/(1-E(2))]^2 \geq \ldots$ and let V(i) be the associated eigenvectors. The linear combinations for stratification or QMC are then chosen to be MV(1), MV(2), ..., MV(k) for some k. This has the effect of computing an approximation of the Eigenvectors of the Hessian matrix.

Extension 4.

The method may be embedded within other methods for pricing different kinds of financial instruments. For example, in pricing "American" securities, two objects need to be estimated: the "exercise region" (i.e., deciding whether to exercise an option at the current time step or continue to the next time step), and the value of the option given an exercise region. The method may be used to assist in estimating either of these objects.

Extension 5

Additional variance reduction techniques, such as antithetic variables or control variables (see Hammersley and Handscomb, supra), may be used in conjunction with the techniques described herein. For example, suppose z is a vector sampled after combining importance sampling (IS) and stratification. Let z' be the "antithetic pair" of z. Then step 507 in FIG. 5 would be replaced by adding [p(s)/2N (s)][L(z)G(z)+L(z')G(z')] to accumulator B.

While the invention has been described in terms of preferred embodiments with modifications or extensions, those skilled in the at will recognize that the invention can be practiced with modification within the spirit and scope of the appended claims.

Having thus described our invention, what we claim as new and desire to secure by Letters Patent is as follows:

1. A computer implemented method for pricing derivative securities comprising the steps of:

choosing an importance sampling (IS) distribution from a parameterized class of distributions based upon an optimization of a derivative security payoff function G(z) times a probability density function f(z);

utilizing the IS distribution to reduce variance; and drawing a plurality of samples to estimate an option price of a derivative security.

2. The computer implemented method for pricing derivative securities recited in claim 1 further comprising the step of combining, the chosen IS distribution with stratification on a set of linear combinations.

3. The computer implemented method for pricing derivative securities recited in claim 1 further comprising the step of combining the chosen IS distribution with quasi-Monte Carlo (QMC) sequences on a set of linear combinations.

4. The computer implemented method for pricing derivative securities recited in claim 1 wherein the IS distribution is multivariate, independent normal with variance one and mean vector chosen to be a point a which optimizes the option payoff G(z) times the joint probability density function f(z).

5. The computer implemented method for pricing derivative securities recited in claim 4 further comprising the step of combining the chosen IS distribution with stratification on a set of linear combinations.

6. The computer implemented method for pricing derivative securities recited in claim 5 wherein there is a single linear combination in the set of linear combinations which is proportional to a(1)z(1)+ ... +a(d)z(d) where a solves the optimization of G(z)f(z).

7. The computer implemented method for pricing derivative securities recited in claim 5 wherein the linear combinations in the set of linear combinations are proportional to a subset of the Eigenvectors of the Hessian matrix of the logarithm of the payoff function evaluated at the optimizing point a.

8. The computer implemented method for pricing derivative securities recited in claim 4 further comprising the step of combining the chosen IS distribution with quasi-Monte Carlo (QMC) sequences on a set of linear combinations.

9. The computer implemented method for pricing derivative securities recited in claim 8 wherein there is a single linear combination in the set of linear combinations which is proportional to a(1)z(1)+ ... +a(d)z(d) where a solves the optimization of the payoff times probability.

10. The computer implemented method for pricing derivative securities recited in claim 8 wherein the linear combinations in the set of linear combinations are proportional to a subset of the Eigenvectors of the Hessian matrix of the logarithm of the payoff function evaluated at the optimizing point a.

11. The computer implemented method for pricing derivative securities recited in claim 1, wherein the IS distribution has a mean vector chosen to approximate a point a selected to approximately optimize the option payoff G(z) times the joint probability function f(z).

12. The computer implemented method for pricing derivative securities recited in claim 11, further comprising the step of combining the chosen IS distribution with stratification or quasi-Monte Carlo (QMC) sequences on a set of linear combinations are proportional to vectors which approximate Eigenvectors of the Hessian matrix of the logarithm of the option payoff function G(z) evaluated at point a.

13. The computer implemented method for pricing derivative securities recited in claim 4 wherein a is selected to optimize F(z)f(z) where F is a different function than G.

14. The computer implemented method for pricing derivative securities recited in claim 1 wherein the IS distribution approximates multivariate, independent normal with variance one and mean vector chosen to be a point which approaches a point a which optimizes the option payoff $G(z)$ times the joint probability density function $f(z)$.

15. The computer implemented method for pricing derivative securities recited in claim 14 further comprising the step of combining the chosen IS distribution with stratification on a set of linear combinations.

16. The computer implemented method for pricing derivative securities recited in claim 15 wherein the linear combinations in a set of linear combinations are a subset of Eigenvectors which are close to but not quite equal to a subset of the Eigenvectors of the Hessian matrix of the logarithm of the payoff function evaluated at a point which approaches the optimizing point a.

17. The computer implemented method for pricing derivative securities recited in claim 14 wherein there is a single linear combination in the set of linear combinations which is proportional to $b(1)z(1)+ \ldots +b(d)z(d)$ where b is close to but not quite equal to a and a solves the optimization of $G(z)f(z)$.

18. The computer implemented method for pricing derivative securities recited in claim 14 further comprising the step of combining the chosen IS distribution with quasi-Monte Carlo (QMC) sequences on a set of linear combinations.

19. The computer implemented method for pricing derivative securities recited in claim 18 wherein there is a single linear combination in the set of linear combinations which is proportional to $a(1)z(1)+ \ldots +a(d)z(d)$ where a solves the optimization of the payoff times probability.

20. The computer implemented method for pricing derivative securities recited in claim 18 wherein the linear combinations in the set of linear combinations are proportional to a subset of the Eigenvectors of the Hessian matrix of the logarithm of the payoff function evaluated at the optimizing point a.

21. The computer implemented method for pricing derivative securities recited in claim 14 wherein a is selected to approximately optimize the option payoff $G(z)$ times the joint probability function $f(z)$.

22. The computer implemented method for pricing derivative securities recited in claim 21, further comprising the step of combining the chosen IS distribution with stratification or quasi-Monte Carlo (QMC) sequences on a set of linear combinations which are proportional to the Eigenvectors of the Hessian matrix of the logarithm of the option payoff function $G(z)$ evaluated at point a.

23. The computer implemented method for pricing derivative securities recited in claim 14 wherein a is selected to optimize $F(z)f(z)$ where F is a different function than G.

24. Computer readable media containing code implementing a method for pricing derivative securities, the method comprising the steps of:
choosing an importance sampling (IS) distribution from a parameterized class of distributions based upon an optimization of a derivative security payoff function $G(z)$ times a probability density function $f(z)$;
utilizing the IS distribution to reduce variance; and
drawing a plurality of samples to estimate an option price of a derivative security.

25. The computer implemented method for pricing derivative securities recited in claim 1, wherein the IS distribution is approximately multivariate, independent normal with variance one and mean vector chosen to be approximately a point a which optimizes the option payoff $G(z)$ times the joint probability density function $f(z)$.

26. The computer implemented method for pricing derivative securities recited in claim 25, furher comprising the step of combining the chosen IS distribution with stratification on a set of linear combinations.

27. The computer implemented method for pricing derivative securities recited in claim 26, wherein there is a single linear combination in the set of linear combinations which is approximately proportional to $a(1)z(1)+ \ldots +a(d)z(d)$ where a solves the optimization of $G(z)f(z)$.

28. The computer implemented method for pricing derivative securities recited in claim 26, wherein the linear combinations in the set of linear combinations are approximately proportional to a subset of the Eigenvectors of the Hessian matrix of the logarithm of the payoff function evaluated at the optimizing point a.

29. The computer implemented method for pricing derivative securities recited in claim 25, further comprising the step of combining the chosen IS distribution with quasi-Monte Carlo (QMC) sequences on a set of linear combinations.

30. The computer implemented method for pricing derivative securities recited in claim 29, wherein there is a single linear combination in the set of linear combinations which is approximately proportional to $a(1)z(1)+ \ldots +a(d)z(d)$.

31. The computer implemented method for pricing derivative securities recited in claim 29, wherein the linear combinations in the set of linear combinations are approximately proportional to a subset of the Eigenvectors of the Hessian matrix of the logarithm of the payoff function evaluated at the point a.

32. The computer implemented method for pricing derivative securities recited in claim 2, wherein the chosen IS distribution has parameters b and density $h(z,b)$ where $h(z,b) \leq h(a,b)$ for all points z, where a approximately optimizes the option payoff function $G(z)$ times the joint probability density function $f(z)$.

33. The computer implemented method for pricing derivative securities recited in claim 3, wherein the chosen IS distribution has parameters b and density $h(z,b)$ where $h(z,b) \leq h(a,b)$ for all points z, where a approximately optimizes the option payoff function $G(z)$ times the joint probability density function $f(z)$.

34. The computer implemented method for pricing derivative securities recited in claim 11, wherein the approximate optimization is accomplished by selecting a reduced number of variables $\underline{z}$ expanded to fall dimensionality by a function g and picking $\underline{a}$ to optimize $G(g(\underline{a}))f(g(\underline{a}))$ and then setting $a=g(\underline{a})$.

35. The computer implemented method for pricing derivative securities recited in claim 34, wherein function g is a linear transformation $z=M\underline{z}$ for a matrix M.

36. The computer implemented method for pricing derivative securities recited in claim 34, wherein the linear combinations are proportional to vectors which approximate Eigenvectors of the Hessian matrix of the logarithm of the payoff function $G(z)$ evaluated at point a.

37. The computer implemented method for pricing derivative securities recited in claim 36, wherein the function g is a linear transformation $z=M\underline{z}$ for a matrix M and the linear combinations are of the form MV where V is an Eigenvector of the matrix $(M^T M)^{-1} H_M$ and $H_M$ is the Hessian matrix of $\ln(G(M\underline{a}))$, thereby computing an approximation to the required Eigenvectors.

38. The computer implemented method for pricing derivative securities recited in claim 34, further comprising the step of combining the chosen IS distribution with quasi-Monte Carlo (QMC) sequences on a set of linear combinations.

39. The computer implemented method for pricing derivative securities recited in claim 38, wherein the function g is a linear transformation $z=M\underline{z}$ for a matrix M and the linear combinations are of the form MV where V is an Eigenvector of the matrix $(M^T M)^{-1} H_M$ and $H_M$ is the Hessian matrix of $\ln(G(M\underline{a}))$, thereby computing an approximation to the required Eigenvectors.

40. A computer readable media having encoded thereon a software process for the pricing of derivative securities which includes the steps of:

choosing an importance sampling (IS) distribution from a parameterized class of distributions based upon an optimization of a derivative security payoff function $G(z)$ times a probability density function $f(z)$;

utilizing the IS distribution to reduce variance; and drawing a plurality of samples to estimate an option price of a derivative security.

\* \* \* \* \*